United States Patent [19]

Stehle

[11] Patent Number: 4,693,379

[45] Date of Patent: Sep. 15, 1987

[54] SCREENING APPARATUS

[75] Inventor: Wolfgang Stehle, Schlier, Fed. Rep. of Germany

[73] Assignee: Maschinenfabrik Bezner GmbH & Co. KG, Ravensburg, Fed. Rep. of Germany

[21] Appl. No.: 793,690

[22] PCT Filed: Feb. 23, 1985

[86] PCT No.: PCT/EP85/00068

§ 371 Date: Oct. 23, 1985

§ 102(e) Date: Oct. 23, 1985

[87] PCT Pub. No.: WO85/03889

PCT Pub. Date: Sep. 12, 1985

[30] Foreign Application Priority Data

Feb. 29, 1984 [DE] Fed. Rep. of Germany ....... 3407460

[51] Int. Cl.[4] .......................... B07B 1/12; B07B 1/38; B07B 1/46; C02F 11/00

[52] U.S. Cl. .................................... 209/674; 209/314; 209/332; 209/930

[58] Field of Search ............... 209/312, 331, 332, 366, 209/393, 395, 674, 930, 314

[56] References Cited

U.S. PATENT DOCUMENTS

| | | | |
|---|---|---|---|
| 1,136,674 | 4/1915 | Houston | 209/674 |
| 1,187,238 | 6/1916 | Beaumont | 209/393 |
| 1,389,231 | 8/1921 | Walker . | |
| 2,290,434 | 7/1942 | Johnson . | |
| 3,241,671 | 3/1966 | Brauchla . | |
| 4,003,831 | 1/1977 | Tishkov et al. | 209/674 X |
| 4,075,087 | 2/1978 | Gerrans . | |

FOREIGN PATENT DOCUMENTS

| | | | |
|---|---|---|---|
| 805956 | 5/1949 | Fed. Rep. of Germany . | |
| 1173317 | 7/1964 | Fed. Rep. of Germany . | |
| 1184191 | 12/1964 | Fed. Rep. of Germany . | |
| 366229 | 2/1932 | United Kingdom | 209/314 |
| 931110 | 7/1963 | United Kingdom . | |

OTHER PUBLICATIONS

Aufbereitungs-Technik, vol. 22, No. 7, Jul. 1981, Wiesbaden (DE), "Mogensen-Stangensizereinenrue Lösung für Verstopfungsfreie Grobklassierung", pp. 395-397.

*Primary Examiner*—Andres Kashnikow
*Attorney, Agent, or Firm*—Spencer & Frank

[57] ABSTRACT

A screening apparatus, particularly for screening valuable materials, domestic garbage, industrial garbage, bulky garbage, dry garbage, wet garbage, compost and/or problematic and dangerous materials, including inclined, open-ended bars capable of oscillatory movement arranged in a transport direction and forming at least two bar grating screens forming a stepped arrangement of bar grating screens with one screen located behind the other in the transport direction. The bar grating screens have bars that are tapered in the transport direction. The apparatus further includes an inlet portion and a preliminary distributor path for feeding in material upstream of at least the upper bar grating screen of the stepped arrangement. A screen frame accommodates the bar grating screens, the inlet portion and the preliminary distributor path. The inlet portion and the preliminary distributor path comprise approximately one third of the entire length of the screening apparatus. Rubber oscillating elements are provided on which the screen frame is mounted. An eccentric drive mechanism is provided for causing the screen frame to perform a circular oscillating movement with a large circular oscillating diameter of approximately 100 mm.

7 Claims, 5 Drawing Figures

SCREENING APPARATUS

BACKGROUND OF THE INVENTION

The invention relates to a screening apparatus, particularly for screening valuable materials, domestic garbage, industrial garbage, bulky garbage, dry garbage, wet garbage, compost and/or problematic and dangerous materials, with inclined bars capable of an oscillatory movement arranged in the transport direction.

German patent application P 34 15 090.0 relates to a sorting installation for sorting valuable materials, particularly dry garbage such as glass, cardboard, paper, plastics or the like. The sorting installation consists of an annular sorting table with manual and mechanical sorting work stations, from which the valuable materials are ejected into sorting shafts and transported in concentrically oriented disposal ducts. The installation according to the above-mentioned patent application exhibits for the preliminary sorting a preliminary sorting path or sorting machine, upon which a separation of two-dimensional and three-dimensional parts is already permitted automatically.

However, the dry garbage heavily agglomerated and entangled from the garbage transport vehicles cannot immediately be thrown directly onto a transport belt and therefore onto the preliminary sorting path according to the installation described in the above German patent application. On the contrary, it appears convenient to feed the dry garbage to the installation via a charging apparatus. It is possible to use for this purpose known moving bar gratings as screening apparatuses, the work surface of which is formed by individual bars or shaped elements which are located parallel or transversely to the conveying direction of the screenings. However, known bar gratings or bar grating screens have the disadvantage that, as a flat screen, they have only a slight cleaning effect in the case of certain materials. Furthermore, the dry garbage arriving non-uniformly cannot be distributed and/or loosened to the required degree on conventional surface screens, because the screen surface tends to clog too easily.

The underlying aim of the present invention is to develop a screening apparatus which serves particularly as a charging apparatus and screening apparatus for valuable materials from domestic garbage, industrial garbage, bulky garbage, dry garbage and/or problematic and dangerous materials. The apparatus should furthermore also be applicable to other work fields with similar sets of problems.

SUMMARY OF THE INVENTION

This aim is achieved according to the invention, starting from an apparatus of the type initially designated, in that at least two bar grating screens arranged consecutively in stepped configuration are provided with bars tapering in the transport direction, the end regions of which pointing in the transport direction are of unsupported and of open construction without fastening means.

A charging apparatus and screening apparatus, particularly for treating the materials according to the above German patent application, has been created as a result of the appartus according to the invention. Thus, the dry garbage of widely varying composition, delivered in the container vehicles for example, can be charged initially onto the apparatus according to the invention. Due to the combination of the essential features of the invention, a screening action and/or a cleaning effect is achieved better than with known revolving screens, in which a continuous alternation of the screenings occurs. However, revolving screens are unsuitable for the present function, because an increased risk of clogging exists due to the continuous alternation of the screenings, and because glass, for example, is smashed by the high fall height. Furthermore, the advantage of the surface screen with a large reception surface, that is to say a large screening surface, is retained. Due to the construction of the apparatus according to the invention, the parts come to lie flat by means of a preliminary distributor path before they reach the bar grating. Consequently, the parts do not fall directly onto the first bar grating, so that the latter cannot become clogged, and the parts cannot fall with their narrow side through the screen apertures. Consequently, substantially only small parts fall through the grating.

Optimum self-cleaning of the bar grating is achieved by the bars in the form of bars clamped at one end and tapering in the transport direction. This applies particularly to materials lacking internal strength such as stockings, string, fabrics, foils et cetera, which normally easily clog the screens. Such materials cannot easily slip through the bar grating screens according to the invention, but are simply pushed off at the free end of the screen bars.

Another critical factor is the ejection process, and the turning process, associated therewith, from an upper bar grating screen onto a further preliminary distributor surface, located therebeneath, of a further bar grating screen, whereby a similar effect to the revolving screen, but without the above-mentioned disadvantages, can be achieved. Obviously, a plurality of such ejection stations may be provided for circulating the material to be processed, that is to say the screening apparatus is of stepped construction. However, the impact process is performed damped, in order that no damage to the valuable materials occurs.

According to a further aspect of the invention, the bars are constructed with circular, rectangular or prismatic or T-shaped profile cross-section, particularly so that, in the case of the prismatic cross-section for example, the free grating cross-section widens trapezoidally downwards, that is to say the narrow side of the prism is arranged underneath. By this means the pieces to be screened can slip more easily through the grating, that is to say the tendency to clog is reduced. The same effect is achieved with a T-shaped profile cross-section.

However, it is also provided that the bars exhibit, in their lower region, projections protruding into the free grating cross-section, against which two-dimensional material becomes braced and does not fall through the screen.

In combination with the conical construction in the longitudinal direction of the bars, and of the unsupported ends, and also of a preferably zigzag-shaped construction of the bars in the longitudinal direction or transport direction, an extraordinarily good screening effect is obtained. The zigzag-shaped construction of the bars causes particularly a retention of paper-shaped material. This is assisted by the oscillatory movement of the screening apparatus which is executed additionally, and the natural oscillations of the bars thereby generated.

According to the invention, the respective bar grating screens are preceded by distributor paths which are likewise set into an oscillatory movement. By this means the material to be screened can be distributed uniformly in order to pass onto the bar grating screen. Furthermore, the distributing function of the charging apparatus is improved.

As a further development of the invention, it is provided that the machine frame is mounted on rubber oscillating elements and is driven by an eccentric drive means to generate the oscillatory movement. These elements require absolutely no maintenance and permit an oscillatory movement which assists the function in accordance with the principle of the invention.

The screening apparatus according to the invention is not limited to the use of screening processes according to the installation of the aforementioned German patent application. On the contrary, similar materials which lead to a clogging of the screening apparatus can be processed without problems. An improved screening effect is also achieved with the circulating principle, according to the invention, of a stepped configuration of the bar grating screen.

BRIEF DESCRIPTION OF THE DRAWINGS

An advantageous and convenient form of construction of the invention is illustrated in the drawing and described more fully in the following description, wherein.

DESCRIPTION OF THE PREFERRED EMBODIMENT

Figure 1:
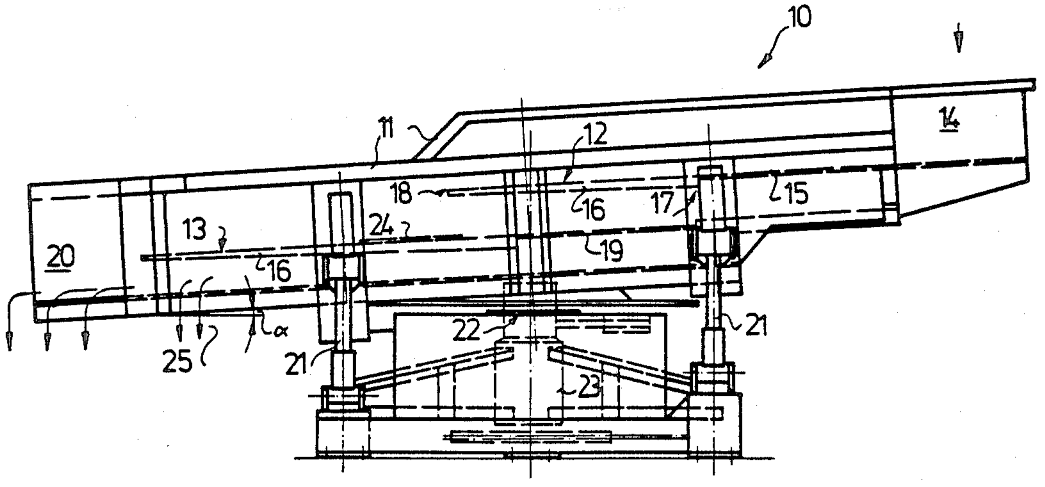
FIG. 1 shows a side elevation of an embodiment according to the invention.
Figure 2:
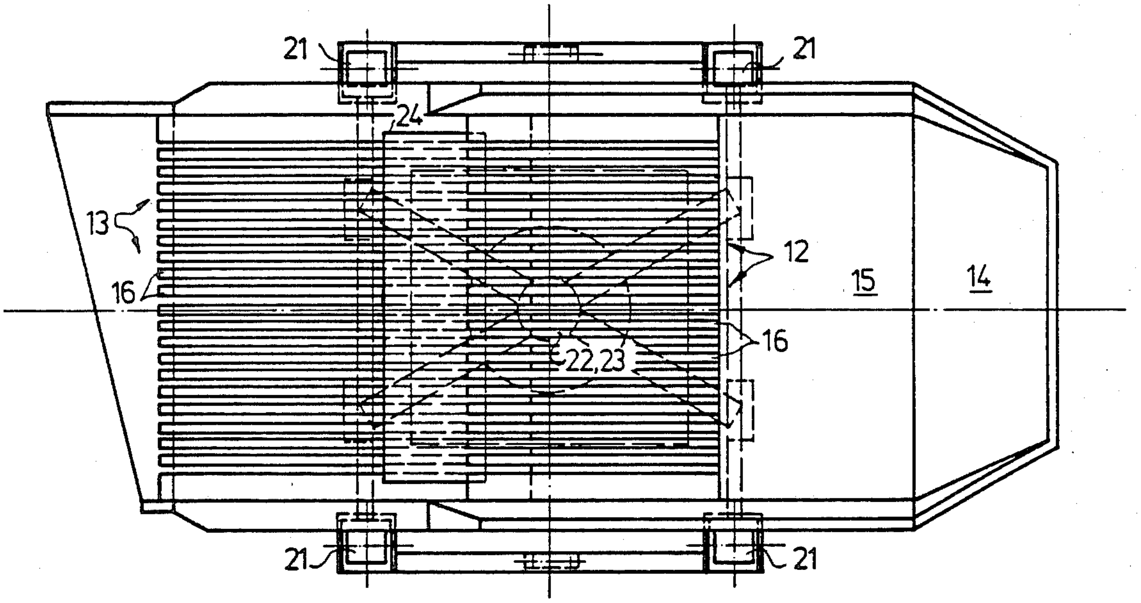
FIG. 2 shows a plan view of the screening apparatus according to the invention.

The screening apparatus 10 illustrated in the drawings consists of a screen chest 11 in which an upper bar grating screen 12 and a lower bar grating screen 13 are arranged. The complete screen chest with bar grating screens exhibits an angle of inclination of 3° to 4°, so that the bar grating screens are inclined slightly downward in the transport direction.

The inlet region 14 of the screening apparatus is followed by a preliminary distributor path 15, upon which the material to be screened can be distributed and laid flat across the total width of the screening apparatus 10. The inlet region 14 and the preliminary distributor path 15 occupy approximately $\frac{1}{3}$ of the total length of the screening apparatus 10.

The preliminary distributor path 15 is followed by the upper bar grating screen 12. The bar grating screen 12 is formed by individual juxtaposed bars 16 arranged in parallel, which are clamped firmly in their region 17 facing the preliminary distributor path 15. On the other hand, the other end 18 located in the transport direction is of unsupported, that is to say open, construction without fastening means. The individual bars 16 are of prismatic construction and taper towards the front end 18, whilst the taper occurs both in plan and also in side elevation. Furthermore, the prismatic cross-section 25 of the bars 16 is constructed so that the free grating cross-section 27 widens downwards, that is to say the narrow prism side of the bars is arranged underneath (shape of an inverted trapezium). Due to this, and also due to the conical construction in the longitudinal direction of the bars, the screenings can pass more easily through the grating and cannot become jammed. The cleaning effect is therefore considerably improved. A T-shaped profile is likewise suitable.

Preferably, the ratio of the support width of each bar 16 to its cantilever length is in the range between 1:50 and 1:100.

Figure 3:
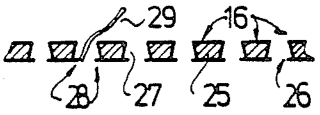
FIG. 3 shows a partial section through the bars of the bar grating screen according to one embodiment.
Figure 4:
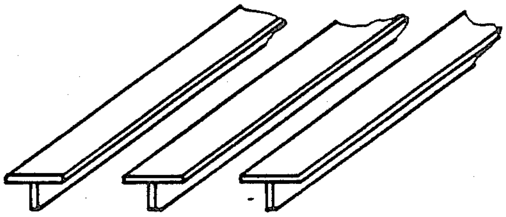
FIG. 4 shows a perspective view of bars having a T-shaped profile according to a further embodiment of the invention.
Figure 5:
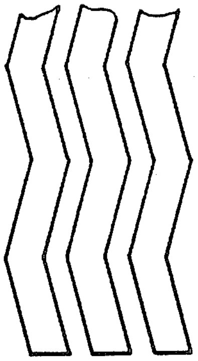
FIG. 5 shows a plan view of bars having a zig-zag shape in the direction of transport according to another embodiment of the invention.

It is frequently desirable for two-dimensional material such as newspapers, sheets of paper or the like not in the form of a continuous ledge 28, for example, which to fall through the screen. For this purpose projections in the form of a continuous ledge 28, for example, which protrude into the free grating cross-section 27, are provided in the lower region 26 of the bars 16. Thus, a sheet 29 sliding into the screen gap 27, for example, is blocked from slipping through, so that it remains on the screen again by the agitating movement and does not slip through (see FIG. 3).

The natural oscillation behaviour of the bars is influenced positively by the decreasing cross-section, so that the cleaning effect is further intensified.

A further preliminary distributor path 19 is provided beneath the upper bar grating screen 12 for the adjacent lower bar grating screen 13. However, the material falling through the upper grating screen 12 reaches the following lower bar grating screen distributed by the lower preliminary distributor path 19. However, it may also selectively be locked out of the screening apparatus at this point.

The final quarter of the upper bar grating screen 12 overlaps with the first quarter of the lower bar grating screen 13. Among the features critical for the good distribution effect and an optimum cleaning effect and/or screening effect, is the damped fall process from the end region of the upper bar grating screen 12 onto the distributor path before the lower bar grating screen 13. The screenings are circulated similarly to a revolving screen by this means.

The lower bar grating screen 13 is in principle of identical construction to the upper bar grating screen 12. The critical features are the conical construction and the unsupported end of the bars, at the ends of which the coarse material drops into a coarse material outlet (20).

The coarse material remaining on the bar grating screens 12, 13 is fed at the end of the screening apparatus 10 to a coarse material outlet 20, from where it can be fed to further processing, in the sorting installation for example. The fine material screened out through the bar grating screens 12, 13 is discharged via the outlet 25 and treated separately or fed to a dump, for example.

The drive mechanism of the screening apparatus is also illustrated in FIG. 1. The entire screen frame 11 is arranged on rubber oscillating elements 21. Such elements are advantageous for the principle according to the invention, because a wide variety of oscillations can be executed by means of an eccentric drive means 22 via a motor 23. Due to the one-sided mounting of the bars of the bar grating screens 12, 13, the latter execute additionally a natural vibratory movement, which likewise has an advantageous influence upon the further transport and the screening of the screenings and upon the cleaning effect. The optimum magnitude of the vibratory movement and the vibration frequency are chosen according to the material to be screened in a manner known per se. Preferably, the eccentric drive means causes the screen frame to perform a circular oscillating movement with a large circular oscillating diameter of approximately 100 mm.

In the region of the ejection path from the upper bar grating screen 12 onto the lower bar grating screen 13, a baffle palte 24 is provided which prevents the material falling down from becoming jammed in the bar grating screen located therebeneath or from falling through by its narrow side.

The alternative construction of the bars in zigzag shape not illustrated in detail in the drawing improves the undesirable slipthrough behaviour of paper-shaped material or the like. For this purpose the bars are respectively angled in zigzag shape for a length of 20 cm for example, at an angle of 5° to 10° to the transport direction for example.

I claim:

1. A screening apparatus, particularly for screening valuable materials, domestic garbage, industrial garbage, bulky garbage, dry garbage, wet garbage, compost and/or problematic and dangerous materials, comprising: inclined, open-ended bars capable of oscillatory movement arranged in a transport direction and forming at least two bar grating screens forming a stepped arrangement of bar grating with one screen located behind the other in the transport direction, wherein said bar grating screens (12,13) have bars (16) that are tapered in the transport direction; said apparatus further comprising: means forming an inlet portion (14) and a preliminary distributor path (15) for feeding in material upstream of at least the upper bar grating screen (12) of said stepped arrangement; a screen frame (11) accommodating said bar grating screens (12,13) and said means forming the inlet portion (14) and the preliminary distributor path (15), said inlet portion (14) and said preliminary distributor path (15) comprising approximately $\frac{1}{3}$ of the entire length of said screening apparatus; rubber oscillating elements on which said screen frame (11) is mounted; and eccentric drive means (22,23) for causing said screen frame (11) to perform a circular oscillating movement with a large circular oscillating diameter of approximately 100 mm.

2. A screening apparatus as claimed in claim 1, wherein said bars (16) exhibit a prismatic cross-section (25), with a free grating cross-section widening downwards.

3. An apparatus as claimed in claim 2, wherein said bars (16) have a trapezoidal cross-section (25) which have in their lower region (26) projections (28) protruding into the free grating cross-section (27).

4. An apparatus as claimed in claim 1, including a preliminary distributor path (19) for the lower bar grating screen (13) arranged beneath said upper bar grating screen (12).

5. An apparatus as claimed in claim 1, wherein the ratio of the support width of the screen bar (16) to its cantilvever length is in the range between 1:50 and 1:100.

6. An apparatus as claimed in claim 1, wherein said bars (16) exhibit the cross-section of a T-shaped profile.

7. An apparatus as claimed in claim 1, wherein said bars (16) run in a zigzag shape in the transport direction.

* * * * *